(12) United States Patent
Stephenson et al.

(10) Patent No.: US 6,776,054 B1
(45) Date of Patent: Aug. 17, 2004

(54) FLOW METER FOR MULTI-PHASE MIXTURES

(75) Inventors: Kenneth Edward Stephenson, Newtown, CT (US); John William James Ferguson, Cambridge (GB); John Barry Fitzgerald, Cambridge (GB); Anthony Robert Holmes Goodwin, Thomaston, CT (US); Gerald Henry Meeten, Ware (GB); Sarah Elizabeth Pelham, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/959,268

(22) PCT Filed: May 8, 2000

(86) PCT No.: PCT/GB00/01758

§ 371 (c)(1), (2), (4) Date: Feb. 4, 2002

(87) PCT Pub. No.: WO00/68652

PCT Pub. Date: Nov. 16, 2000

(30) Foreign Application Priority Data

May 10, 1999 (GB) ............................................. 9910718
Aug. 17, 1999 (GB) ............................................. 9919271

(51) Int. Cl.[7] .............................................. G01F 1/44
(52) U.S. Cl. ................................................ 73/861.63
(58) Field of Search ........................ 73/861.04, 861.67, 73/861.63, 861.52

(56) References Cited

U.S. PATENT DOCUMENTS

| | | | |
|---|---|---|---|
| 4,096,745 A | 6/1978 | Rivkin et al. ............. | 73/194 B |
| 4,236,406 A | 12/1980 | Reed et al. .............. | 73/61.1 R |
| 4,441,362 A | 4/1984 | Carlson ....................... | 73/153 |
| 4,856,344 A | 8/1989 | Hunt ....................... | 73/861.04 |
| 5,361,632 A | 11/1994 | Magnani ....................... | 73/155 |
| 5,400,657 A | 3/1995 | Kolpak et al. ........... | 73/861.04 |
| 5,661,237 A | 8/1997 | Dussan V. et al. ........ | 73/152.18 |
| 5,822,390 A | 10/1998 | Hewitt et al. ................. | 378/53 |
| 5,893,642 A | 4/1999 | Hewitt et al. ............... | 366/338 |
| 6,345,537 B1 * | 2/2002 | Salamitou ................ | 73/861.04 |
| 6,405,604 B1 * | 6/2002 | Berard et al. ............ | 73/861.63 |
| 6,467,358 B1 * | 10/2002 | Nishi et al. .............. | 73/861.04 |
| 6,532,826 B1 * | 3/2003 | Dou ........................ | 73/861.04 |
| 6,612,187 B1 * | 9/2003 | Lund ....................... | 73/861.04 |

FOREIGN PATENT DOCUMENTS

| | | | |
|---|---|---|---|
| EP | 733780 A1 | 3/1996 | .......... E21B/47/10 |
| GB | 2266597 A | 4/1992 | ............ G01F/1/74 |
| GB | 2289543 A | 1/1994 | ............ G01F/1/74 |
| GB | 2307300 A | 11/1996 | ............ G01F/1/74 |
| GB | 2351810 A | 8/1999 | ............ G01F/1/74 |
| WO | WO 95/02165 | 7/1994 | ............ G01F/1/74 |

OTHER PUBLICATIONS

3–Phase Measurements AS (Framo Engineering Brochure), pp. 1–6, "Framo Multiphase Flow Meter for Topside and Subsea Applications".

* cited by examiner

*Primary Examiner*—Harshad Patel
(74) *Attorney, Agent, or Firm*—William L. Wang; William B. Batzer; John J. Ryberg

(57) ABSTRACT

A method and apparatus is disclosed for determining the flow rates of fluid phases in a pipe containing multiple fluid phases. A Venturi is provided to measure total volumetric flow rate measurement and a holdup measurement is taken approximately 3–10 pipe diameters downstream of the Venturi. The holdup measurement is made at a downstream location where a substantial amount of mixing occurs and the differences between the velocities of the fluid phases can effectively be ignored. The flow rates of the phases can thus be determined directly from the holdup measurements.

60 Claims, 9 Drawing Sheets

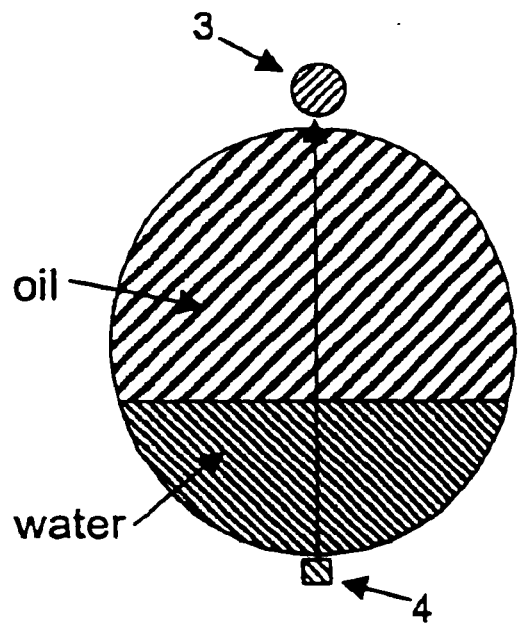
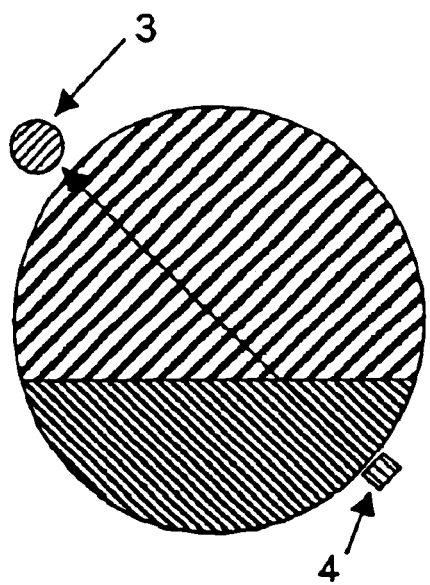
Fig. 7a  Fig. 7b
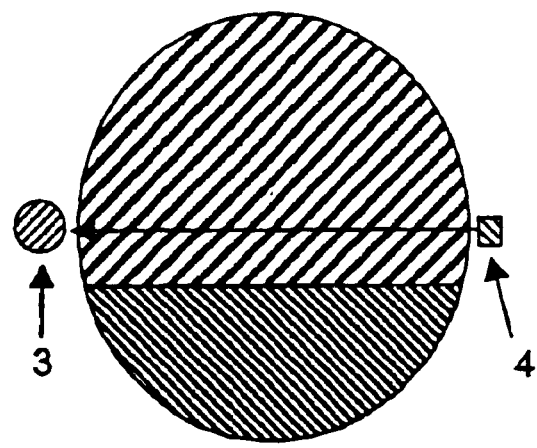
Fig. 7c

FLOW METER FOR MULTI-PHASE MIXTURES

FIELD OF THE INVENTION

The present invention relates to the field of flow meters for multiphase mixtures. In particular, the invention relates to flow meters for oil and water mixtures in hydrocarbon boreholes.

BACKGROUND OF THE INVENTION

The measurement of oil and water flow rate in each producing zone of an oil well is important to the monitoring and control of fluid movement in the well and reservoir. In addition to a flow meter, each zone may have a valve to control the fluid inlet from that zone. By monitoring flow rates of oil and water from each zone and reducing flow from those zones producing the highest water cut (i.e., ratio of water flow rate to total flow rate), the water production of the entire well can be controlled. This, in addition, allows the reservoir oil to be swept more completely during the life of the well.

Ideally, a flow meter in such an installation should satisfy several criteria: 1) it should be extremely reliable and operate for years at downhole temperature and pressure; 2) it should operate in both stratified (near-horizontal) and dispersed flow regimes over a wide range of total flow rate and cut; 3) it should not require that the completion be oriented azimuthally in any particular way during installation; 4) it should not require licensing of radioactive sources and, finally; 5) the flow meter should allow small changes in water cut and flow rate to be detected.

Typically, downhole flow meters determine the holdup (volume fraction of oil or water) and the velocity of the oil phase, the water phase, or both. The flow rate of water is then determined from the product of water holdup $\alpha_w$, the pipe area A, and the velocity of water $U_w$. An analogous relation holds for oil flow rate. In general, the velocities of water and oil are different. The slip velocity (difference in oil and water velocities) depends on many parameters, such as the inclination angle of the flow pipe (i.e. deviation), roughness of the pipe wall, and flow rates of the two phases. In general, one must measure the holdup and velocities of both oil and water to determine oil and water flow rate uniquely. In practice, sometimes one measures the velocity of only one phase and uses a theoretical or empirically determined slip law to obtain the other. This has a number drawbacks including inaccuracies due to differences conditions used as inputs to the model and the actual conditions downhole.

A common method to determine the velocity of a fluid is to measure the rotation rate of a turbine blade in the flow stream. In single phase flow, the rotational velocity of the turbine is simply related to the velocity of the flow. However, in mixed oil and water flow the response of the turbine can be so complicated as to be uninterpretable.

Another method of velocity measurement uses tracers. A tracer is injected into the phase of choice (oil or water) and, at a known distance downstream, a sensor detects the time of passage of the tracer. The velocity is computed from the known distance and time of travel. One disadvantage of the tracer method for permanent downhole use is the need for a reservoir of tracer material and a mechanical tracer injector. The reservoir limits the number of measurements and the injector, being a mechanical device, is prone to sticking and failure.

Another method of velocity measurement uses local capacitance or resistance sensors. This method is appropriate for flow regimes in which one phase is dispersed as droplets in another continuous phase. As a droplet passes one of the sensors, a signal is produced for a time duration related to the speed of the droplet. Given knowledge of the droplet size by other means, the velocity of the droplet can be deduced. One disadvantage of this method is that it does not work at all in a stratified flow regime, since it relies on the existence of bubbles.

There are other methods of flow measurement that can be used, which are not described herein, but are familiar to those skilled in the art.

Another method of velocity measurement uses a Venturi. In single phase flow, a Venturi generally obeys the Bernoulli equation which relates volumetric flow rate Q to fluid density ρ and pressure drop from the inlet to the throat of the Venturi:

$$Q = C \sqrt{\frac{2\Delta p/\rho}{\left(\frac{1}{A_{throat}^2} - \frac{1}{A_{inlet}^2}\right)}} \qquad \text{Equation 1}$$

where C is the discharge coefficient which is approximately unity but depends on the geometry of the Venturi, Δp is the pressure drop from Venturi inlet to throat, and $A_{throat}$ at and $A_{inlet}$ are the throat and inlet cross sectional areas, respectively. The same equation can be used to determine the combined oil and water flow rate where the density in this case is the average mixture density in the throat of the Venturi. In practice, the square root in the equation makes it relatively insensitive to errors in both the density and pressure determinations.

A common method to determine the holdup in a flow of oil and water is to measure the average density of the fluid. Since oil at downhole pressure and temperature typically has a density which is smaller than that of water (around 0.7 g/cm³ compared to 1.0 g/cm³), the oil and water holdups $\alpha_o$ and $\alpha_w$ can be determined proportionately from the mixture density by the relations $$\alpha_o = \frac{\rho_w - \rho_{mix}}{\rho_w - \rho_o} \qquad \text{Equation 2}$$

$$\alpha_w = \frac{\rho_{mix} - \rho_o}{\rho_w - \rho_o} \qquad \text{Equation 3}$$

A common method to determine the mixture density is to measure the hydrostatic pressure of a column of fluid with a gradiomanometer. This device relies on having a component of the gravitational force vector along the axis of the flow pipe. This type of device, however, fails when the flow pipe is horizontal because the gravitational force vector is perpendicular to the pipe axis.

Another method to determine holdup uses capacitor plates to measure the bulk dielectric constant of the fluid. This method is used for flow regimes in which the water is dispersed in bubbles within an oil-continuous medium. It fails in stratified flow or in flow regimes in which the oil is dispersed in bubbles within a water-continuous medium.

Another method to determine holdup uses electrodes or an inductive coupling to measure the bulk resistance of the fluid. This method is used for flow regimes in which the oil is dispersed in bubbles within a water-continuous medium. It fails to work properly in stratified flow or in flow regimes in which the water is dispersed in bubbles within an oil-continuous medium.

Another method to determine holdup uses arrays of capacitor plates or resistance electrodes to measure dielectric constant or resistance in the fluid immediately surrounding the sensor. The accuracy of this method depends on the number of sensors in the array. The disadvantages with this method are that small probes are prone to damage and fouling and the probes are invasive to the pipe, preventing other tools or devices from passing by them freely.

Mixers of various types have been used to mix the oil and water, so as to effectively reduce the slip and allow for more accurate determination of the flow rates. Some mixers are simply small orifices in plates of suitable material. Others comprise more elaborate fins having certain twists or curled shapes. There are a number of disadvantages, however, in using conventional mixers when trying to measure the flow rates of oil and water downhole. For example, the mixer often obstructs the borehole, such that it may be difficult to pass certain equipment such as production logging tools, etc. Mixers also can produce unacceptable amounts of pressure loss. Additionally, mixers are prone to excessive wear with age.

It is possible to measure the pressure differential upstream and downstream of a conventional mixer in an attempt to determine the total flow rate of oil and water. This technique, however, has a number of drawbacks. For example, the accuracy of the flow rate determined by this method is likely to be much lower than using a Venturi, and, in general, greatly dependent upon the flow rates. Using a mixer to measure pressure differential can also lead to inaccuracy due to sensitivity to the exact location of pressure measurement. Using a conventional mixer in this fashion would also be prone to problems associated with wear. For example, in an orifice mixer, the relationship between the pressure differential and the velocity could change significantly over time due to slight changes in shape and size of the orifice caused by wear.

U.S. Pat. No. 4,856,344, issued to Hunt, discloses using a Venturi for obtaining a pressure differential and using a gradiomanometer upstream and through the Venturi to measure density. Hunt discloses using an iterative process to estimate the relative flow velocities. Hunt also discloses using a separate upstream step discontinuity to mix the fluids upstream of the gradiomanometer. However, the method disclosed in Hunt is prone to problems associated with relying on estimates of the flow velocities (i.e. a slip model), using separate additional mixers upstream, and using a gradiomanometer (e.g. nonfunctional when pipe is horizontal, and low accuracy when near-horizontal).

U.S. Pat. No. 5,361,632, issued to Magnani, discusses a holdup measurement using a combination of gradiomanometer and gamma-ray densitometer. Thus, the method of Magnani is prone to problems associated with using a gradiomanometer which is not suitable for measurements in near-horizontal pipes. Furthermore, the method obstructs the borehole and would not be suitable for permanent installation.

U.S. Pat. No. 5,661,237, issued to Dussan et al. discusses a holdup measurement using local probes. There is no mention of a Venturi, however. The method obstructs the borehole and would not be suitable for permanent installation.

U.S. Pat. Nos. 5,893,642 and 5,822,390, issued to Hewitt et al. disclose a method of using a mixer to measure flow rates. However, this method suffers from the disadvantages of using a mixer as described above. For example, the mixer obstructs borehole and is not suitable for permanent installation due to problems of wear.

SUMMARY OF THE INVENTION

Thus, it is an object of the present invention to provide a flow meter suitable for downhole placement that is extremely reliable and capable of operating for years at downhole temperatures and pressures. It is another object of the invention to provide a flow meter that is capable of operating in both stratified (near-horizontal) and dispersed flow regimes over a wide range of total flow rate and cut. It is another object of the invention to provide a flow meter that does not require that the wellbore be oriented azimuthally in any particular way during installation. It is another object of the invention to provide a flow meter that does not require the use of relatively strong radioactive sources. It is another object of the present invention to provide a flow meter that is capable of detecting small changes in water cut and flow rate. It is another object of the invention to alleviate the problems associated with the use of conventional mixers, including the possible problems associated with measuring the pressure differential upstream and downstream of a conventional mixer. It is another objective of this invention to provide a measurement of a phase transition pressure.

In this invention, we combine a Venturi total volumetric flow rate measurement with a holdup measurement approximately 3–10 pipe diameters downstream of the Venturi. The invention makes use of a flow instability downstream of the Venturi throat. When the oil and water flow accelerates into the throat of the Venturi, the streamlines converge from their upstream value and the pressure drops as the hydrostatic head is converted into kinetic energy. Conversely, as the flow enters the diffuser section the pressure recovers as the flow decelerates. This adverse pressure gradient can lead to separation of the flow within the boundary layer at some position downstream of the throat of the Venturi. That position depends on the geometry of the Venturi, the individual oil and water flow rates, the deviation angle of the pipe to the horizontal, and the densities of the two fluids. The main flow expands beyond the Venturi as a jet of approximately uniform velocity bounded by a free shear layer, and such shear layers are prone to Kelvin-Helmholtz type instabilities that grow and are convected downstream. In the diffuser of the Venturi, an instability such as this grows and perturbs the interface between the two fluids. The amplitude of the instability depends on the geometry of the Venturi, the deviation of the pipe, the densities of the fluids, and the flow rates. An instability of sufficient strength causes the interface to roll up and break with a resulting mixing of the two layers completely across the pipe.

According to the invention, a method of determining the flow rate of a first fluid phase in a pipe containing at least two fluid phases is provided. The fluid phases flow through an upstream pipe, a constriction, which is preferably a Venturi, and a downstream pipe. The differential pressure of the fluid phases is measured such that it can be related to the total flow rate of the fluid phases through the section of pipe. The differential pressure is preferably measured between the upstream pipe and the throat of the Venturi. The volume fraction of the first fluid phase (preferably water) is determined by making a measurement at a location downstream of the constriction where a substantial amount of mixing of the at least two fluid phases is present, which results from the fluid passing through the Venturi. The flow rate of the first fluid (preferably water) is determined by assuming its velocity is substantially the same as that of the other fluid phases.

BRIEF DESCRIPTION OF THE DRAWINGS

FIGS. 7a–c illustrate the effects of different orientations of the attenuation path where the flows of oil and water are not sufficiently mixed.

DETAILED DESCRIPTION OF THE INVENTION

Figure 1:
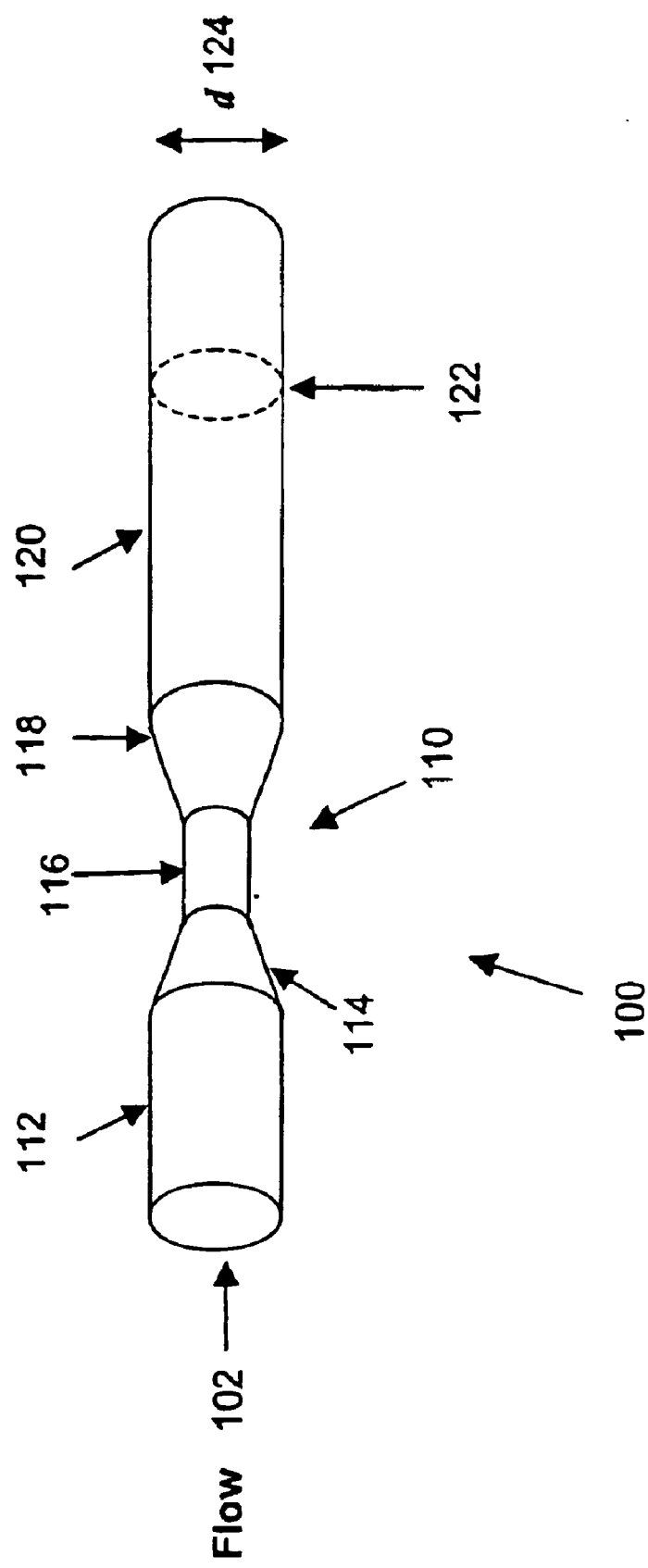
FIG. 1 is a perspective view of a section of pipe including a Venturi used to measure velocity and to mix oil and water according to a preferred embodiment of the invention.

FIG. 1 is a perspective view of a section of pipe 100 including a Venturi 110 used to measure velocity and to mix oil and water according to a preferred embodiment of the invention. The direction of flow is shown by arrow 102. Pipe section 112 is upstream of the Venturi 110. Venturi 110 comprises a tapered inlet section 114, a Venturi throat 116, and a Venturi diffuser 118. Pipe section 120 is downstream of the Venturi 110, and has diameter 124. According to the invention, it has been found that significant mixing of oil and water takes place downstream of Venturi 110 and therefore it is a good place to make a holdup measurement. In FIG. 1, downstream location 122 is shown to be a suitable location for measuring the holdup.

Figure 2:
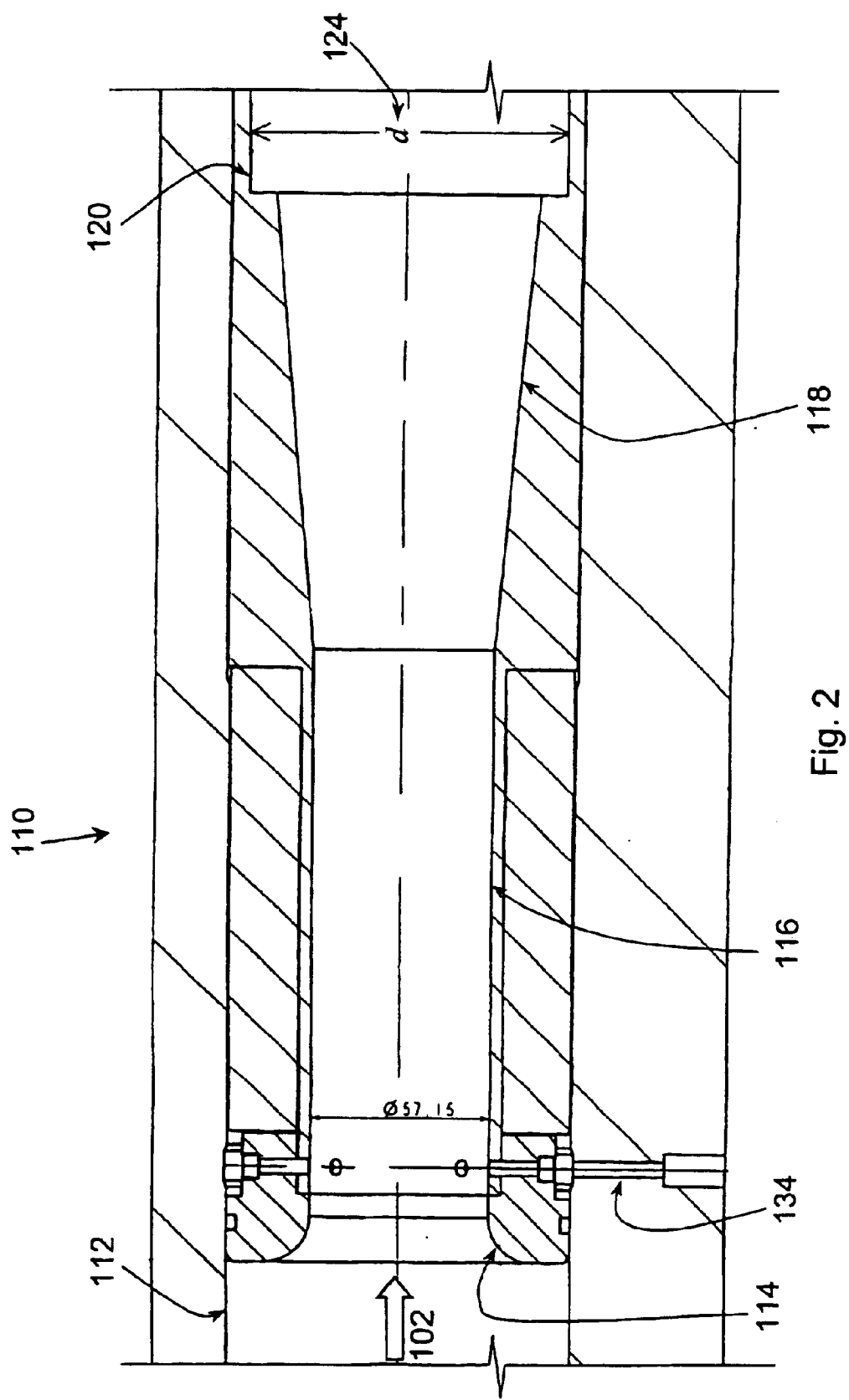
FIG. 2 is a detailed cross sectional view of a Venturi used to measure velocity and to mix oil and water according to a preferred embodiment of the invention.

FIG. 2 is a detailed cross sectional view of a Venturi used to measure velocity and to mix oil and water according to a preferred embodiment of the invention. The direction of flow is shown by arrow 102. Inlet 114 is smoothly tapered from the diameter of the upstream section 112 to the diameter of the Venturi throat 116. As shown in FIG. 2, the Venturi throat 116 has a diameter narrower than upstream section 112. The walls of the Venturi throat 116 are preferably approximately parallel along the direction of flow 102. The Venturi diffuser 118 is gradually tapered from the diameter of the Venturi throat 116 to approximately the diameter 124 of the downstream section 120. Upstream section 112, inlet 114, throat 116, diffuser 118, and downstream section 120 all have approximately circular cross-sections, and the diameter of the throat 116 is preferably about half that of the upstream pipe section (i.e. beta=0.5). For, example if the upstream pipe section diameter is 15 cm, then the throat is preferably about 7.5 cm. Preferably, Venturi 110 is designed to meet the ISO standard and is designed so as to allow for relatively accurate measurements of differential pressure, while impeding the flow as little as possible. However, it is contemplated that other Venturi dimensions and geometries could also facilitate an accurate differential pressure measurement and provide sufficient mixing for an accurate holdup measurement, according to the invention. The location with respect to the Venturi where the holdup measurements were taken is shown at downstream location 120. As will be described in greater detail below, measuring the holdup at locations downstream as shown advantageously allows for much more accurate determinations of flow rates. As shown in FIG. 2, a port 134 is provided to measure the pressure at a location within Venturi throat 116. Another port, not shown in FIG. 2, is provided upstream which in combination with port 134 allows for measurement of pressure differential.

Figure 3:
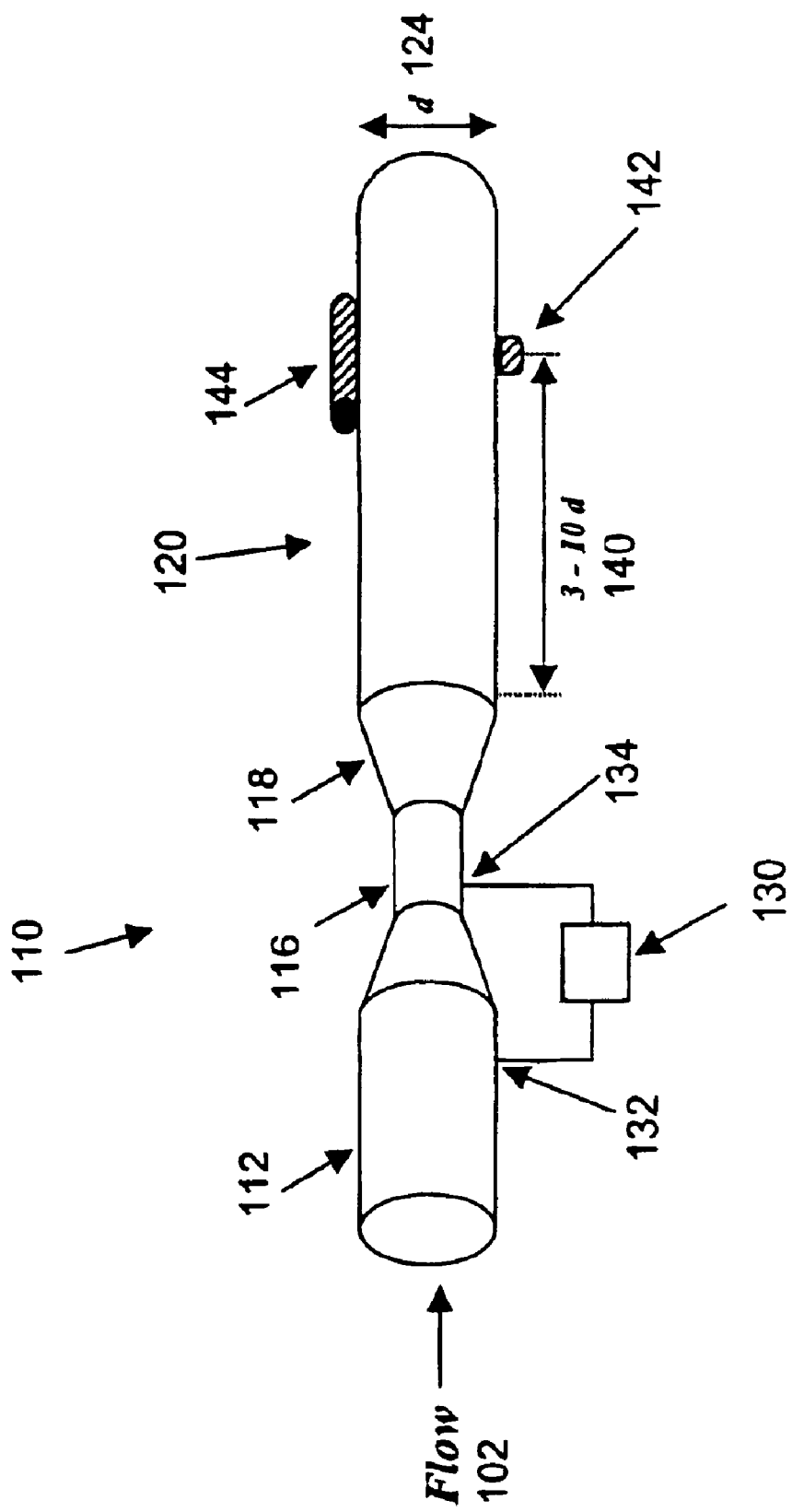
FIG. 3 is a perspective view of a section of pipe including a Venturi and other equipment used to measure velocity and to mix oil and water according to a preferred embodiment of the invention.

FIG. 3 is a perspective view of a section of pipe including a Venturi and other equipment used to measure velocity and to mix oil and water according to a preferred embodiment of the invention.

In a preferred embodiment shown in FIG. 3, the invention combines a Venturi 110 with a simple gamma-ray attenuation density measurement. A differential pressure sensor 130 measures the pressure drop between the inlet 112 (at port 132) and the Venturi throat 116 (at port 134). (Note that although the pressure sensor 130 is shown to measure the differential pressure between the locations of ports 132 and 134, other locations could be chosen. For example, although unconventional, one of the measurements could be taken downstream of the Venturi.) A flow instability develops as the flow exits from the Venturi diffuser 118. A source of gamma-rays 142 is provided which is preferably $^{133}$Ba, (although $^{137}$Cs or other isotopes can also be used). Preferably, source of gamma-rays 142 is sufficiently weak as to be exempt from licensing. A gamma-ray detector 144, preferably a NaI(Tl) scintillation detector, is placed diametrically opposite source 142. The gamma-ray source 142 and detector 144 are preferably placed at a particular location which is a distance 3–10 times the downstream pipe diameter 124. With no fluid in the pipe, gamma-rays from the source travel across the pipe and are detected in the gamma-ray detector with a certain rate $R_s$. With fluid in the pipe, the gamma-rays are scattered and absorbed according to the density of the fluid, with the result that the detection rate R is reduced according to $$R = R_s e^{-\tau \rho d} \qquad \text{Equation 6}$$

where d is the diameter of the pipe, ρ is the average density of fluid along the path between source and detector, and τ is the mass attenuation coefficient, which is essentially constant for typical borehole fluids. One may calibrate the device with a known fluid, for instance water, giving $$R_w = R_s e^{-\tau \rho_w d} \qquad \text{Equation 7}$$

Then one may determine the average oil holdup $\alpha_o$ (or water holdup using the relation $\alpha_w = 1 - \alpha_o$) of a mixture of oil and water along the attenuation path of the gamma-rays (across the diameter of the pipe) from the mixture density ρmix and Equations 2 and 7 according to $$\rho_{mix} = \frac{\ln(R_s) - \ln(R_{mix})}{d\tau} \qquad \text{Equation 8}$$

$$\alpha_o = \frac{\ln(R_{mix}) - \ln(R_w)}{d\tau(\rho_w - \rho_o)} \qquad \text{Equation 9}$$

This holdup, which is the average along the attenuation path, is equal to the pipe area averaged holdup because the oil and water are mixed relatively thoroughly throughout the pipe cross-section. It has been found on the basis of flow loop experiments that this condition is satisfied approximately 3–10 pipe diameters downstream of the downstream end of the Venturi diffuser even if the flow entering the Venturi is stratified. However, a substantial improvement in the accuracy of determining the relative flow rates of water and oil can be obtained under some circumstances by measuring the holdup at any location from just downstream of the Venturi to about 20 pipe diameters. For example, it may be sufficiently accurate to measure the holdup at locations where the stratification has been significantly perturbed.

It is possible to determine density from direct PVT measurements on the fluid, or by determining either the decay time or resonance frequency of a vibrating body, or from an equation of state with the appropriate input data (usually the chemical composition and pressure-volume-temperature measurements of the fluid). An equation of state is a function that provides thermodynamically consistent data on the configurational properties of liquids and gases. The term equation of state is used to describe an empirically-derived function which provides a relation between pressure, density, temperature, and for mixtures composition. The samples used for these analyses can be obtained from separator, surface or bottom hole sampling. The latter provides a sample at the location of the flowmeter and as such is the preferred method. A Wireline tool, such as either the MDT or RFT can be used to obtain these samples. When three phases are present, detailed pressure-volume-temperature-composition measurements of the fluid are preferably performed to provide density and phase volumes. The presently preferred method is to obtain the densities with an equation of state from compositional data. In the case where oil, gas and water are present, the volume or mole fraction of the gas and oil are also preferably obtained from the equation of state to facilitate the determination of water holdup.

It is presently believed that measuring the holdup in a region approximately 3–5 diameters from the Venturi can provide even greater accuracy over a wider range of flow rates. Finally, under the tested conditions, it is believed that measuring the holdup at approximately 5 diameters from end of the diffuser will provide the greatest accuracy in relative flow rate measurement.

In general, the distance from the Venturi at which a suitable amount of mixing occurs will depend on many factors. First the amount of mixing needed to substantially improve flow rate determination depends on the method of holdup measurement. For example, if more than one gamma-ray beam is used, at different angles, a lower amount of mixing may be acceptable to accurately determine the holdup and water cut. Second, the distance from the Venturi at which suitable mixing occurs depends on the particular geometry and anticipated flow rates of the fluids in the Venturi. Furthermore, the density and viscosity of the fluids, and the deviation can influence the amount and location of mixing caused by the Venturi.

Figure 9:
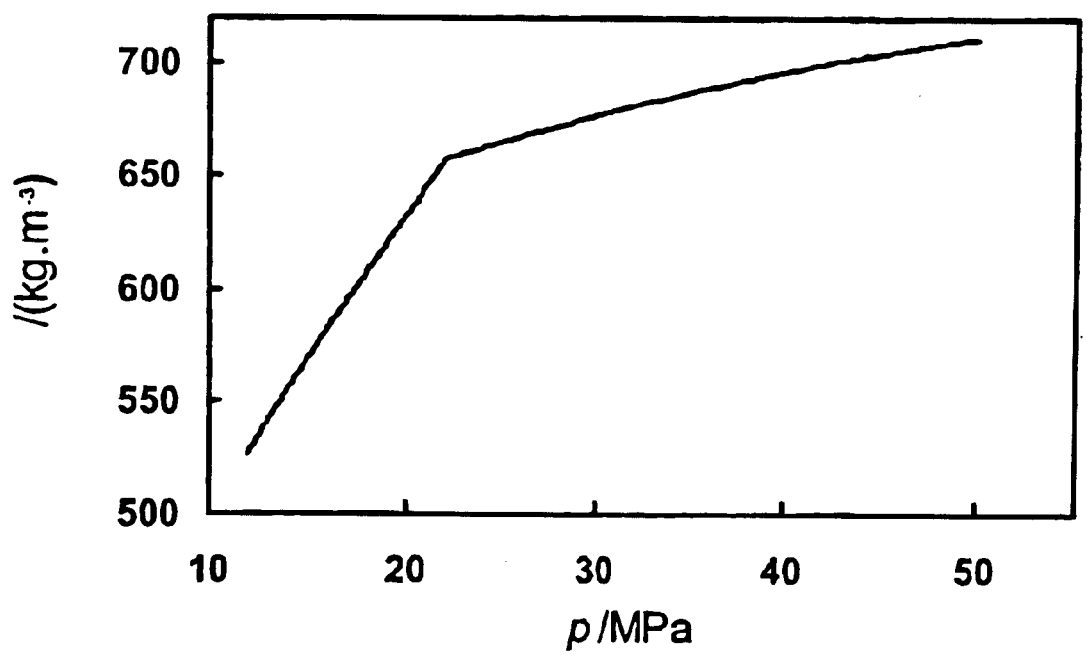
FIG. 9 is a graph showing the density determined with the preferred embodiment as a function of pressure.

In addition, continual monitoring of the average density of fluid provides a means of determining phase boundaries. Indeed, the gamma-radiation attenuation, which determines the density of the objects in the radiation path is proportional to the volume fraction of each phase multiplied by the density of each phase. This is the preferred method for phase boundary detection as shown in FIG. 9 for a bubble point. FIG. 9 is a graph showing the density determined with the preferred embodiment as a function of pressure. Clearly, the bubble pressure is easily detected as a discontinuity in $(\partial \rho / \partial p)_T$ indicates the bubble. Other methods, such as PVT experiments, familiar to those skilled in the art could also be used.

The total flow rate is computed from Equation 1, using the mixture density computed from Equation 8. Holdup is computed from Equation 9 and the oil and water flow rates are computed from Equations 4 and 5.

Figure 4:
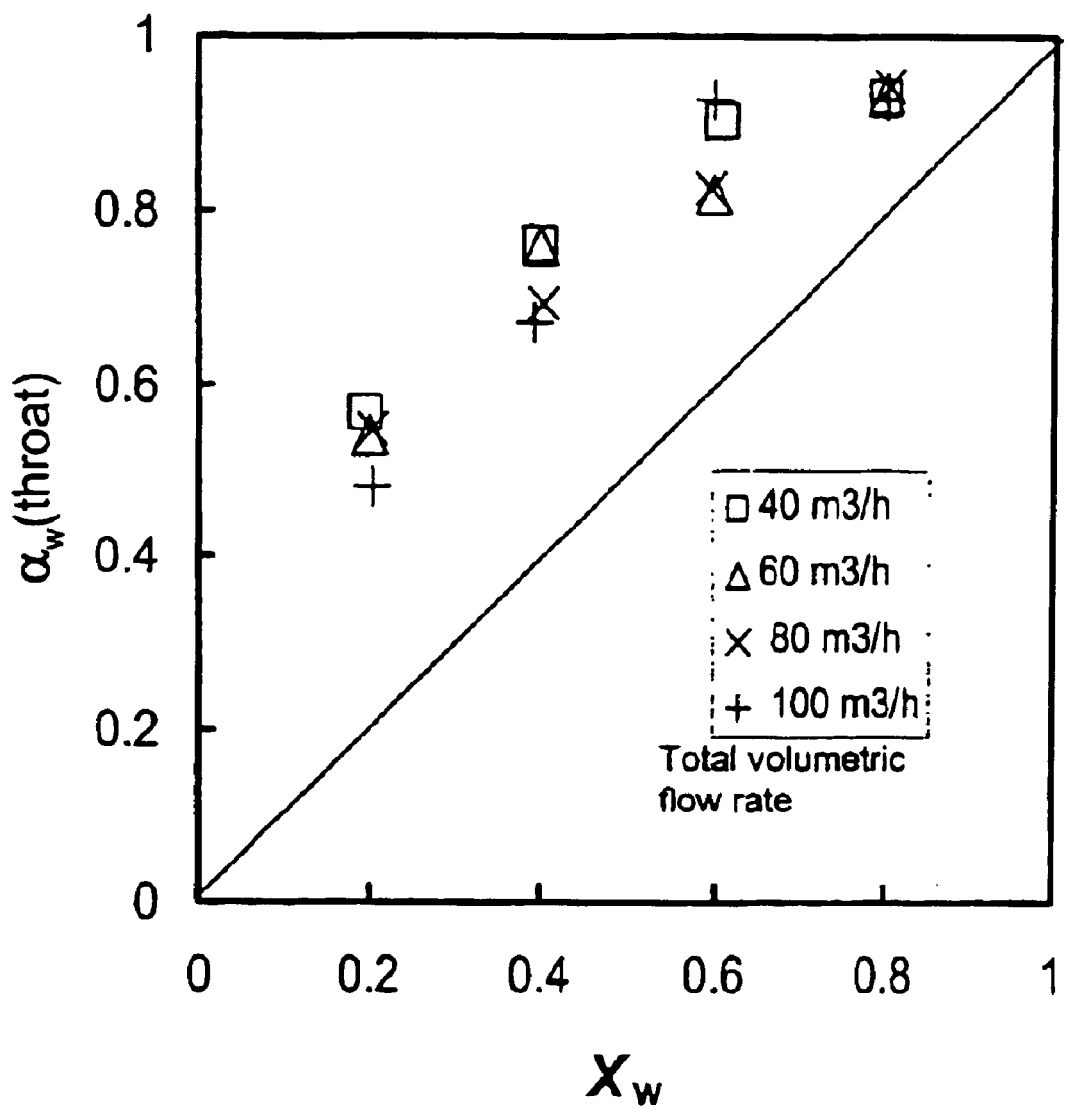
FIG. 4 is a graph illustrating the relationship between water holdup compared to the water cut as experimentally measured at a Venturi throat section.

FIG. 4 is a graph illustrating the relationship between water holdup compared to the water cut as experimentally measured at a Venturi throat when flowing various mixtures of oil and water. The vertical axis is the water holdup, or the volume fraction of water. The horizontal axis is water cut, or the ratio of water flow rate to the total volumetric flow rate. The measurements were taken at different total volumetric flow rates ranging from 40 cubic meters per hour to 100 cubic meters per hour. As can be seen in FIG. 4, the water holdup varies significantly from the water cut at all measured flow rates.

Figure 5:
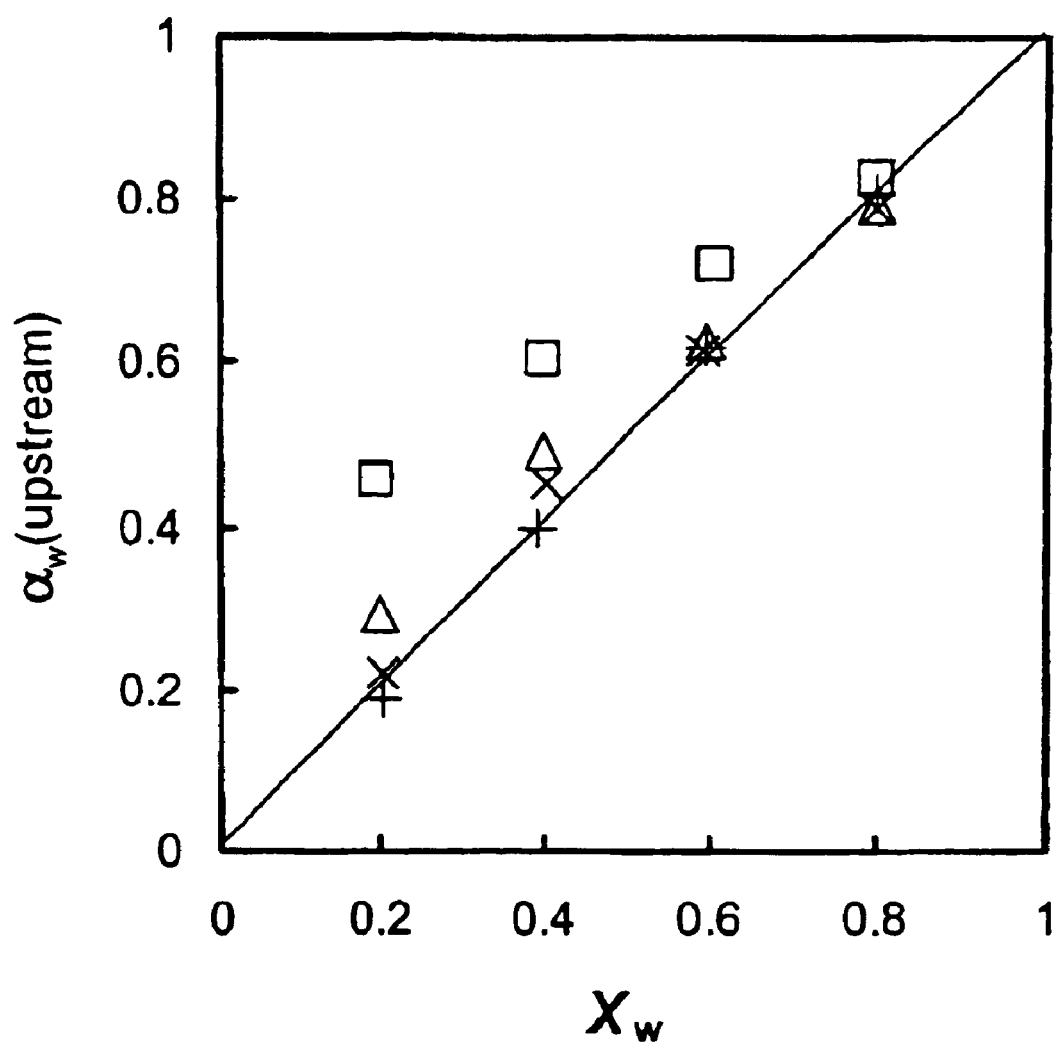
FIG. 5 is a graph illustrating the relationship between water holdup compared to the water cut as experimentally measured at a location upstream from a Venturi.

Similarly, FIG. 5 is a graph illustrating the relationship between water holdup compared to the water cut, but the holdup measurements were made at a location upstream from a Venturi. As in FIG. 4, the holdup measurements do not accurately reflect the water cut values for most of the flow rates measured.

Figure 6:
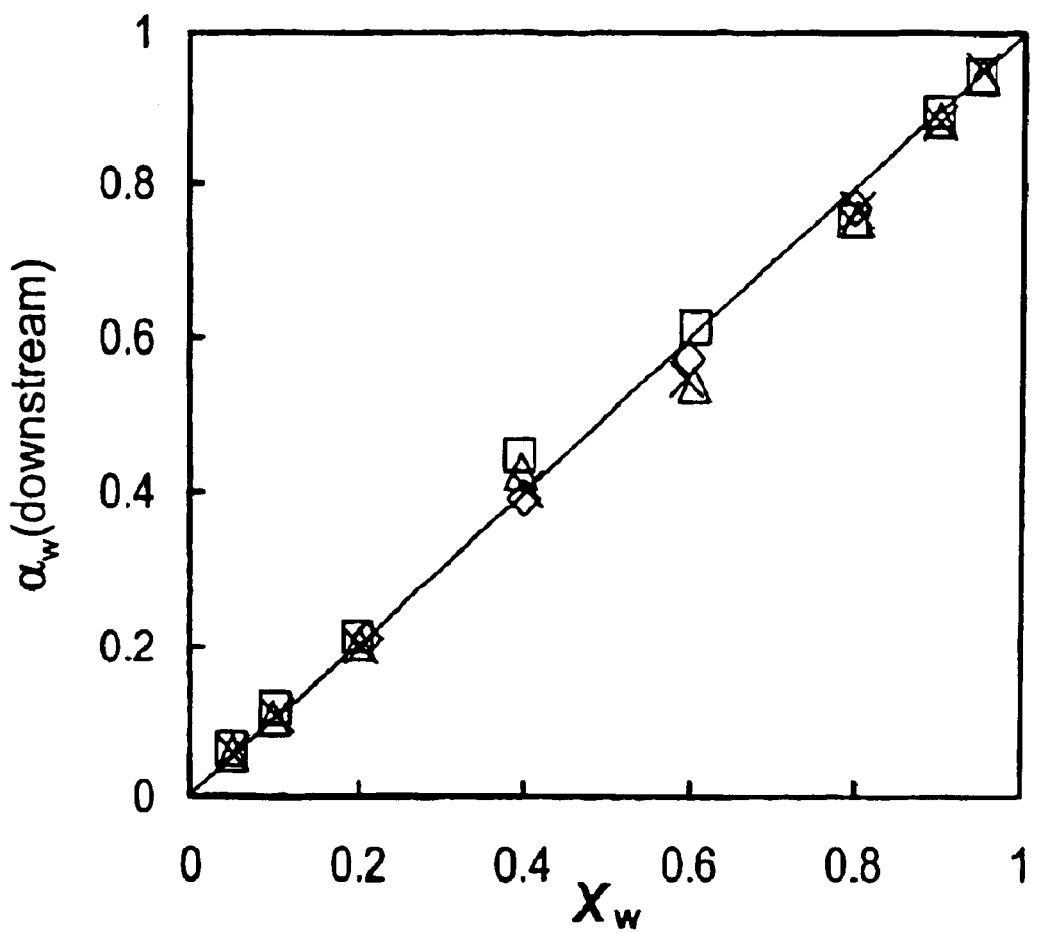
FIG. 6 is a graph illustrating the relationship between water holdup compared to the water cut as experimentally measured at a location downstream from a Venturi, according to a preferred embodiment of the invention.

FIG. 6 is a graph illustrating the relationship between water holdup compared to the water cut as experimentally measured at a location downstream from a Venturi, according to a preferred embodiment of the invention. Specifically, in FIG. 6, the water holdup was measured at a location approximately 3 pipe diameters downstream from the downstream end of the Venturi diffuser. As can be seen in FIG. 6, in stark contrast from the data in FIGS. 4 and 5, the measured holdup accurately reflects the water cut at all the measured flow rates.

Thus, we have experimentally found that a significant instability exists downstream of the Venturi regardless of the flow regime at the inlet of the Venturi as long as the total flow rate exceeds a minimum value. For example, for a 15 cm diameter upstream section of pipe with a Venturi throat diameter of about 7.5 cm (i.e. beta=0.5), approximately 20 cubic meters per hour. Because of this instability and the mixing that it produces, oil and water are well-mixed approximately 3–10 pipe diameters downstream of the Venturi exit, although as mentioned above, other measuring the holdup at other locations may be suitable in certain situations.

Due to the well-mixed condition, the oil and water are nearly homogeneously distributed throughout the pipe and the slip velocity between oil and water is very small. In such a condition, the water holdup is equal to the water cut Xw, or ratio of the water volumetric flow rate to the total flow rate. Conversely, the oil holdup is equal to the oil cut, or ratio of the oil volumetric flow rate to the total flow rate. This is important because the oil and water flow rates can then be obtained directly from the product of the respective holdup and total flow rate from the Venturi:

$$Q_o = X_o Q = \alpha_o Q \qquad \text{Equation 4}$$

$$Q_w = X_w Q = \alpha_w Q \qquad \text{Equation 5}$$

Advantageously, no slip model is required. Even if the water holdup is not exactly the same as the water cut, differences of a few percent can be incorporated as empirical corrections to the equations given above. Preferably, the holdup measurement is made at a location downstream of the Venturi where the difference between the water holdup and the water cut is be negligible for the particular measurement requirements the application at hand.

According to the invention, many of methods of holdup measurement, including most of those mentioned above, could be used to measure holdup at a location downstream from the Venturi, so long as the downstream measurement is taken at a location that experiences a suitable amount of mixing. For example, it is possible to determine holdup by measuring the sound speed of the fluid, or by determining either the decay time or resonance frequency of a vibrating body. (Note that using a conventional gradiomanometer may not be suitable, since that method ordinarily relies on pressure differentials taken over lengths that are substantially greater than length of mixed oil and water provided by the Venturi.) However, the preferred embodiment in this invention is to determine the fluid density by measuring the attenuation of gamma-rays across a diameter of the pipe. The determination of density from gamma-ray attenuation is well known in the art. Conventionally, because of temporal inhomogeneities in the flow, large radioactive sources are usually used to measure density in a short period of time. However, because in the present invention the flow is relatively homogeneous in time and space, the density measurement may be taken over several seconds or minutes, allowing the use of very weak sources that are exempt from licensing. Additionally, this very simple measurement can use detectors that are similar to those already in use in conventional Wireline gamma-ray logging tools.

In a well-mixed flow, the average fluid density determined across a diameter of the pipe, such as given by gamma-ray attenuation, is equivalent to the average fluid density over the entire pipe. Also, there is little slip and the water holdup is essentially equal to the water cut.

It is important to note that such conditions do not exist at other locations in the pipe, such as upstream of the Venturi or in the Venturi throat. At each of the locations upstream, downstream and in the Venturi throat, the gamma-ray attenuation has been measured along a vertical path and the density and holdup extracted from it for several different total flow rates. The water holdup at the Venturi throat is compared to the water cut in FIG. 4. Clearly, the holdup is not equal to the cut, indicating that the mixture is not homogeneous. In FIG. 5, the water holdup upstream is compared to the water cut. Again, the holdup is not equal to the cut. Finally, in FIG. 6, the water holdup downstream at a spacing of 3 pipe diameters from the Venturi exit is plotted against water cut. In this case the holdup is very nearly equal to the cut.

Also, it is important to note for holdup measurements made upstream and at the Venturi throat, the orientation of the attenuation path is important because the flow is not homogeneous. For example, upstream and in near-horizontal orientation of the pipe, the flow will often be stratified. FIGS. 7a–c illustrate the effects of different orientations of the attenuation path where the flows of oil and water are not sufficiently mixed. Clearly, the average density along the three paths is different. For example, in FIG. 7c the attenuation path is located entirely in the oil. In this instance, there is no information at all about the average density or holdup.

However, at downstream locations where a substantial mixing occurs (for example, at a spacing 3–10 pipe diameters from the downstream end of the Venturi diffuser) the flow is homogeneous and the attenuation measurement provides the mixture density and holdup.

Figure 8:
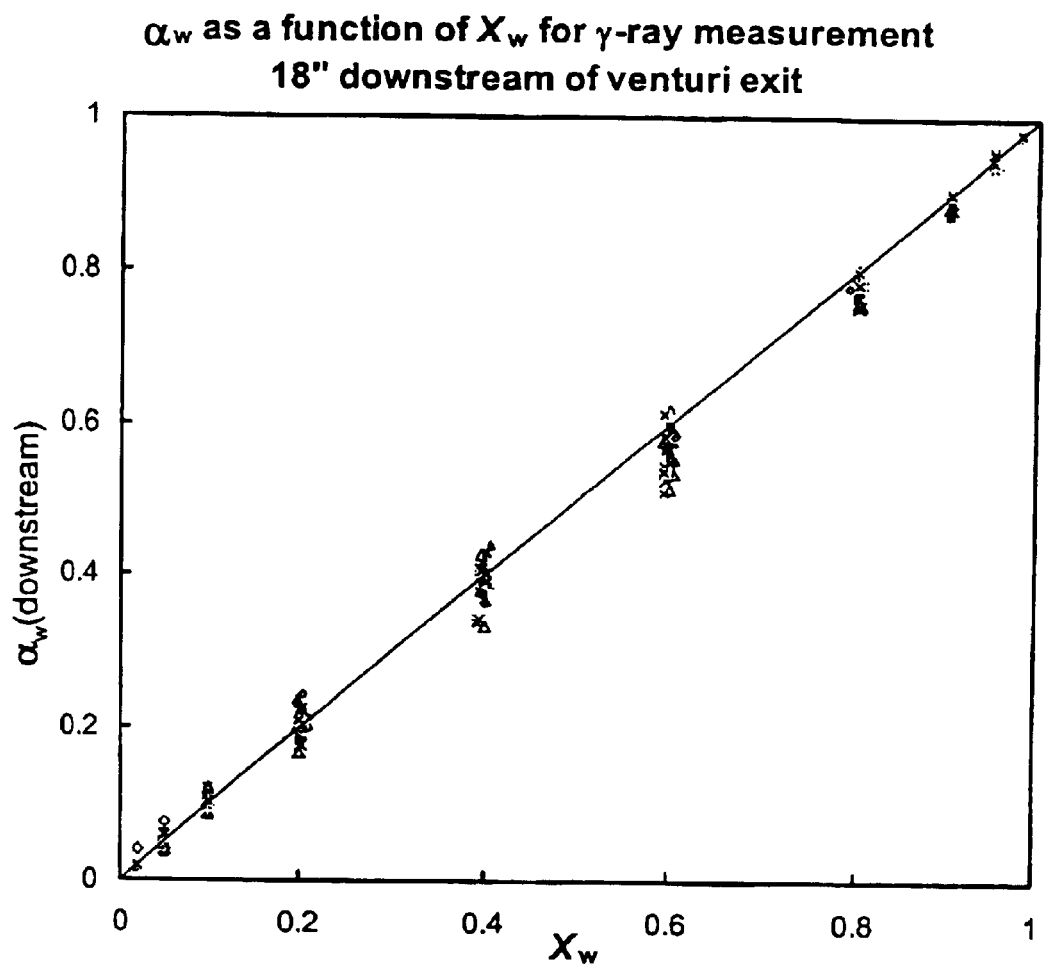
FIG. 8 is a graph comparing water holdup measured downstream and water cut, for various flow rates, cuts, inclinations and attenuation path orientations.

Some of the further advantages of measuring the holdup at such downstream locations are shown in FIG. 8. FIG. 8 is a graph comparing water holdup measured downstream and water cut, for various flow rates, cuts and inclinations and attenuation path orientations. The holdup measurements were taken at a distance approximately three pipe diameters downstream of the Venturi. The data were taken at flow rates varying from 60 to 120 cubic meters per hour, at inclinations (i.e. the vertical tilt of the flowpath) ranging from 70 to 90 degrees, and at three attenuation path orientations as shown in FIGS. 7a–c. As can be seen from the graph, the measured holdup very closely approximates the water cut over a wide range of values. Significantly, the holdup is nearly equal to the cut over the different orientations and inclination angles.

While preferred embodiments of the invention have been described, the descriptions are merely illustrative and are not intended to limit the present invention. For example, although the present invention has thus far been principally described in connection with measuring fluid flow rates in mixtures of oil and water, the present invention is also applicable to facilitate the determination of fluid flow rates in other mixtures. In general, a Venturi could also be used to determine velocity and as a mixer for mixtures of any fluids, including gas phases. For example, two liquids, one liquid and one gas, or two liquids and one gas. The geometry of the Venturi should be designed so as to facilitate a suitable amount of mixing at the flow rates of interest, and the measurement of the holdup should be taken at a downstream location where a sufficient amount of mixing takes place to enable an accurate determination of flow rate from the measured volume fraction.

In the case where a gas phase is present, the holdup can be determined from measurements of density with either equations (2) or (3), and an equation of state, or direct measurements, can be used to determine the oil and water densities. In the presence of three phases, oil, water and gas below the bubble pressure, the average hydrocarbon density can be determined with an equation of state based on a compositional analysis. For three phase fluid, oil, water, and gas, the volume (mole fraction) average density of the oil and gas are used in the analysis which is consistent in this domain with the density determined with the gamma-ray for the water, oil and gas. The preferred method makes use of an equation of state.

As mentioned, the present invention is applicable to mixtures of three or more phases, where a suitable Venturi can be used to both measure velocity and mix the various phases. So long as the velocity of the phases and the geometry of the Venturi is sufficient to mix the various phases, the amount of slip can be reduced to a relatively small level and accurate flow rates can be determined. When determining flow rates in mixtures of three or more phases, one or more additional measurements should be taken to determine the particular holdup of interest, since the single gamma-ray beam would only indicate an average density for all the phases. For example, two suitably chosen different gamma-ray energies could be used to determine the fraction of each of three phases. However in the case where the two of the phases are oil and gas the following method can be advantageously used. The individual hydrocarbon phase densities are determined (as can be the aqueous phase) with an equation of state as described above.

We claim:

1. A method of determining the flow rate of a first fluid phase in a pipe containing at least two fluid phases, the method comprising the steps of:

flowing the at least two fluid phases through a section of the pipe comprising an upstream pipe, a constriction, and a downstream pipe;

determining a differential pressure of the fluid phases between a first location and a second location, the first and second locations positioned such that the differential pressure resulting from the fluid phases passing through at least part of the constriction can be related to the total flow rate of the fluid phases through the section of pipe; and determining the volume fraction of the first fluid phase by at least in part making a measurement at a location downstream of the constriction where a substantial amount of mixing of the at least two fluid phases is present and where the velocities of the at least two phases is approximately the same.

2. The method of claim 1 wherein the constriction is a Venturi and the substantial amount of mixing results from the fluid phases passing through the Venturi.

3. The method of claim 2 wherein the Venturi comprises a throat, and the first location is at the throat.

4. The method of claim 3 wherein the second location is at the upstream pipe.

5. The method of claim 3 wherein the second location is at the downstream pipe.

6. The method of claim 3 wherein the throat of the Venturi comprises approximately parallel walls defining a diameter of the throat.

7. The method of claim 6 wherein the Venturi further comprises a diffuser immediately downstream of the throat, the diffuser comprising walls having a diameter approximately equal to the diameter of the throat at an upstream end, and the walls being tapered to a larger diameter towards a downstream end.

8. The method of claim 1 wherein the measurement used in determining the volume fraction of the first fluid phase is made at a location having a distance from the constriction of approximately 3–20 times the diameter of the downstream pipe.

9. The method of claim 8 wherein the measurement used in determining the volume fraction of the first fluid phase is made at a location having a distance from the constriction of approximately 3–10 times the diameter of the downstream pipe.

10. The method of claim 9 wherein the measurement used in determining the volume fraction of the first fluid phase is made at a location having a distance from the constriction of approximately 3–5 times the diameter of the downstream pipe.

11. The method of claim 10 wherein the measurement used in determining the volume fraction of the first fluid phase is made at a location having a distance from the constriction of approximately 5 times the diameter of the downstream pipe.

12. The method of claim 1 wherein the measurement used in determining the volume fraction of the first fluid phase is made at a location where the flow of the at least two phases is not stratified.

13. The method of claim 12 wherein the measurement used in determining the volume fraction of the first fluid phase is made at a location where the velocities of the at least two phases is approximately the same.

14. The method of claim 13 wherein the measurement used in determining the volume fraction of the first fluid phase is made at a location where the holdup and the ratio of phase flow rates or cut for the first fluid phase are within a few percent.

15. The method of claim 13 wherein the measurement used in determining the volume fraction of the first fluid phase is made at a location where the difference between the holdup and the ratio of phase flow rates or cut for the first fluid phase is negligible.

16. The method of claim 1 wherein the measurement taken in determining the volume fraction of the first fluid phase comprises a density measurement of the at least two fluid phases.

17. The method of claim 16 wherein the density is measured by determining the attenuation of least one gamma-ray beam passing through the fluid phases.

18. The method of claim 17 wherein the at least one gamma-ray beam is produced using a weak source.

19. The method of claim 18 wherein the weak source of the gamma-ray beam comprises a $^{137}$Cs source.

20. The method of claim 18 wherein the weak source of the gamma-ray beam comprises a $^{133}$Ba source.

21. The method of claim 16 wherein the density measurement is used to determine the transition pressure for at least one of fluid phases.

22. The method of claim 21 wherein the fluid phase for which the transition pressure is determined substantially comprises hydrocarbons.

23. The method of claim 22 wherein the transition pressure is the bubble point of the hydrocarbon fluid phase.

24. The method of claim 1 further comprising the step of determining the individual densities of the at least the two fluid phases.

25. The method of claim 24 wherein the individual densities are determined using an equation of state.

26. The method of claim 25 wherein compositional data is used in determining the individual densities.

27. The method of claim 26 wherein the compositional data is derived from samples of the fluid phases.

28. The method of claim 24 wherein the phase densities are determined from samples of the fluid phases.

29. The method of claim 1 wherein the measurement taken in determining the volume fraction of the first fluid phase comprises a capacitance measurement of the at least two fluid phases.

30. The method of claim 1 wherein the measurement taken in determining the volume fraction of the first fluid phase comprises a resistivity measurement of the at least two fluid phases.

31. The method of claim 1 wherein the measurement taken in determining the volume fraction of the first fluid phase comprises a measurement of the fluid phases using a gradiomanometer.

32. The method of claim 1 wherein the measurement taken in determining the volume fraction of the first fluid phase comprises a measurement of the speed of sound in the at least two fluid phases.

33. The method of claim 1 wherein the measurement taken in determining the volume fraction of the first fluid phase comprises determining either the decay time or resonance frequency of a vibrating body in the at least two fluid phases.

34. The method of claim 1 further comprising the step of determining the flow rate of the first fluid phase using the volume fraction of the first fluid and the differential pressure, and assuming the velocities of the first fluid phase and another phase is substantially the same.

35. The method of claim 1 wherein the first fluid phase is water and a second fluid phase is oil.

36. The method of claim 1 wherein the constriction is installed in a subterranean hydrocarbon borehole.

37. The method of claim 36 wherein the constriction is suitable for permanent installation in a hydrocarbon borehole.

38. The method of claim 37 wherein the constriction is dimensioned such that a production logging tool can pass through it.

39. The method of claim 1 wherein the first fluid phase is a gas and a second fluid phase is a liquid.

40. The method of claim 39 wherein the first fluid phase is hydrocarbon gas and the second fluid phase is a hydrocarbon liquid.

41. The method of claim 40 further comprising the step of determining the individual densities of the at least the two fluid phases using an equation of state and compositional data.

42. The method of claim 1 wherein the step of flowing comprises flowing second and third fluid phases through the section of pipe, the method further comprising the step of determining the volume fractions of the second and third fluid phases by making a measurement at a location downstream of the constriction where a substantial amount of mixing of the first, second and third fluid phases is present.

43. The method of claim 42 wherein the first fluid phase is hydrocarbon gas and the second fluid phase is a hydrocarbon liquid.

44. The method of claim 43 further comprising the step of determining the individual densities of the first and second fluid phases using an equation of state and compositional data.

45. An apparatus for determining the flow rate of a first fluid phase in a pipe containing at least two fluid phases, the apparatus comprising:
- an upstream pipe having a diameter;
- a Venturi having a throat with a throat diameter, the Venturi disposed immediately downstream from and in fluid communication with the upstream pipe;
- a downstream pipe having a diameter, disposed immediately downstream from and in fluid communication with the Venturi;
- a throat pressure meter configured to determine a throat pressure of the fluid phases measured at the throat;
- a second pressure meter configured to determine the pressure of the fluid phases measured at a second location, the second location positioned such that the change in pressure resulting from the fluid phases passing through at least part of the Venturi can be related to the total flow rate of the fluid phases; and
- a holdup calculator adapted and configured to determine the volume fraction of the first fluid phase by making a measurement at a location downstream of the throat where a substantial amount of mixing of the at least two fluid phases is present and where the velocities of the at least two phases is approximately the same.

46. The apparatus of claim 45 wherein the measurement used in determining the volume fraction of the first fluid phase is made at a location where the flow of the at least two phases is not stratified.

47. The apparatus of claim 45 wherein the measurement used in determining the volume fraction of the first fluid phase is made at a location where the holdup and the ratio of phase flow rates or cut for the first fluid phase are within a few percent.

48. The apparatus of claim 45 wherein the measurement used in determining the volume fraction of the first fluid phase is made at a location where the difference between the holdup and the ratio of phase flow rates or cut for the first fluid phase is negligible.

49. The apparatus of claim 48 wherein the substantial amount of mixing results from the fluid phases passing through the Venturi.

50. The apparatus of claim 49 wherein the second location is on the upstream pipe.

51. The apparatus of claim 50 wherein the Venturi further comprises a diffuser immediately downstream of the throat, the diffuser comprising walls having a diameter at an upstream end approximately equal to the diameter of the throat, and the walls of the diffuser being tapered to a larger diameter towards a downstream end of the diffuser.

52. The apparatus of claim 51 wherein the upstream pipe, the Venturi, and the downstream pipe are installed in a subterranean hydrocarbon borehole, and the Venturi is dimensioned such that a production logging tool can pass through it.

53. The apparatus of claim 52 wherein the upstream pipe, the Venturi, and the downstream pipe are suitable for permanent installation in a hydrocarbon borehole.

54. The apparatus of claim 53 wherein the measurement used in determining the volume fraction of the first fluid phase is made at a location having a distance from the diffuser of approximately 3–20 times the diameter of the downstream pipe.

55. The apparatus of claim 54 wherein the measurement used in determining the volume fraction of the first fluid phase is made at a location having a distance from the diffuser of approximately 3–10 times the diameter of the downstream pipe.

56. The apparatus of claim 55 wherein the measurement used in determining the volume fraction of the first fluid phase is made at a location having a distance from the diffuser of approximately 3–5 times the diameter of the downstream pipe.

57. The apparatus of claim 56 wherein the measurement used in determining the volume fraction of the first fluid phase is made at a location having a distance from the diffuser of approximately 5 times the diameter of the downstream pipe.

58. The apparatus of claim 55 wherein the measurement taken in determining the volume fraction of the first fluid phase comprises a density measurement of the at least two fluid phases, which is measured by determining the attenuation of least one gamma-ray beam passing through the fluid phases.

59. The apparatus of claim 58 wherein the at least one gamma-ray beam is produced using a weak source.

60. The apparatus of claim 48 wherein the pipe containing the at least two fluid phases is oriented approximately horizontally.

* * * * *